(12) United States Patent
Le

(10) Patent No.: US 11,849,089 B1
(45) Date of Patent: Dec. 19, 2023

(54) IMAGE FORMING APPARATUS

(71) Applicant: KYOCERA Document Solutions Inc., Osaka (JP)

(72) Inventor: Hung Phi Le, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/342,650

(22) Filed: Jun. 27, 2023

(30) Foreign Application Priority Data

Jun. 28, 2022 (JP) ................................. 2022-103186

(51) Int. Cl.
*H04N 1/00* (2006.01)

(52) U.S. Cl.
CPC ..... *H04N 1/00554* (2013.01); *H04N 1/00559* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2009/0122330 | A1* | 5/2009 | Andoh | H04N 1/0053 358/1.13 |
| 2020/0238739 | A1* | 7/2020 | Arakawa | B41J 25/006 |

FOREIGN PATENT DOCUMENTS

| | | |
|---|---|---|
| JP | H1026922 A | 1/1998 |
| JP | 3763717 B2 * | 4/2006 |

OTHER PUBLICATIONS

Translation of JP 3763717-B2 (Year: 2006).*

* cited by examiner

*Primary Examiner* — Lennin R Rodriguezgonzalez
(74) *Attorney, Agent, or Firm* — Alleman Hall Creasman & Tuttle LLP

(57) ABSTRACT

A supported portion of a cover member is rotatably supported by a main support portion of a main body, and is slidable with respect to the main support portion along an extending direction of the cover member. A first joint portion of a link member is rotatably supported by a joint support portion. A second joint portion of the link member is engaged with a joint guide portion slidably along the extending direction. When the cover member is in an open position, a cover engagement portion engages with a main body engagement portion, and the second joint portion engages with a guide base end of the joint guide portion. When the cover member is in the open position, a moment load of the cover member around the second joint portion acts as a force for holding the engagement between the cover engagement portion and the main body engagement portion.

3 Claims, 4 Drawing Sheets

IMAGE FORMING APPARATUS

INCORPORATION BY REFERENCE

This application is based upon and claims the benefit of priority from the corresponding Japanese Patent Application No. 2022-103186 filed on Jun. 28, 2022, the entire contents of which are incorporated herein by reference.

BACKGROUND

The present disclosure relates to an image forming apparatus including a cover member capable of opening and closing a side opening of a main body.

An image forming apparatus such as a printer, a copier, or a multifunction peripheral is provided with a cover member and a cover support mechanism. The cover member closes an opening formed in a side surface of a main body. The cover support mechanism supports the cover member openably and closably.

SUMMARY

An image forming apparatus according to one aspect of the present disclosure includes a printing portion, a cover member, and a cover support mechanism. The printing portion is disposed in a main body and configured to form an image on a sheet. The cover member is configured to close a side opening formed in a side surface of the main body. The cover support mechanism is configured to support the cover member rotatably between a closed position and an open position. The cover member closes the side opening in the closed position, and projects from a lower edge of the side opening of the main body to outside of the main body in the open position. The cover support mechanism includes a main support portion, a supported portion, a joint support portion, a joint guide portion, a link member, a main body engagement portion, and a cover engagement portion. The main support portion is provided at the lower edge of the side opening of the main body. The supported portion is provided at a base end of the cover member. The joint support portion provided at a position higher than the main support portion in the main body. The joint guide portion is formed in the cover member along an extending direction. The link member includes a first joint portion and a second joint portion. The main body engagement portion is provided at a deeper position from the side opening than the main support portion in the main body. The cover engagement portion is provided at the base end of the cover member and engageable with the main body engagement portion. The extending direction is a direction along a line connecting the base end and a distal end of the cover member. The supported portion is rotatably supported by the main support portion and is slidable with respect to the main support portion along the extending direction. The first joint portion is rotatably supported by the joint support portion. The second joint portion is engaged with the joint guide portion so as to be slidable along the extending direction. When the cover member is in the closed position, the main support portion supports the supported portion at one end of a sliding range along the extending direction. The cover member is rotatable around the main support portion between the closed position and the open position. When the cover member rotates, the link member rotates around the first joint portion, and the joint guide portion guides the second joint portion along the extending direction. When the cover member is in the open position, the cover engagement portion engages with the main body engagement portion, and the second joint portion engages with a guide base end which is one end of the joint guide portion on a base end side of the cover member. When the cover member is in the open position, a moment load of the cover member around the second joint portion acts as a force for holding the engagement between the cover engagement portion and the main body engagement portion, and the link member and the main body engagement portion hold the cover member in the open position. When the cover member is in the open position, the support of the supported portion by the main support portion is released.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the drawings. It is noted that the following embodiment is an example of embodying the present disclosure and does not limit the technical scope of the present disclosure.

[Configuration of Image Forming Apparatus 10]

An image forming apparatus 10 according to an embodiment includes a printing device 4 that performs a print process. The print process is a process of forming an image on a sheet 9. The printing device 4 is an example of the printing portion.

The printing device 4 performs the print process using an electrophotographic method. The sheet 9 is an image forming medium such as paper or a sheet-like resin member.

Figure 1:
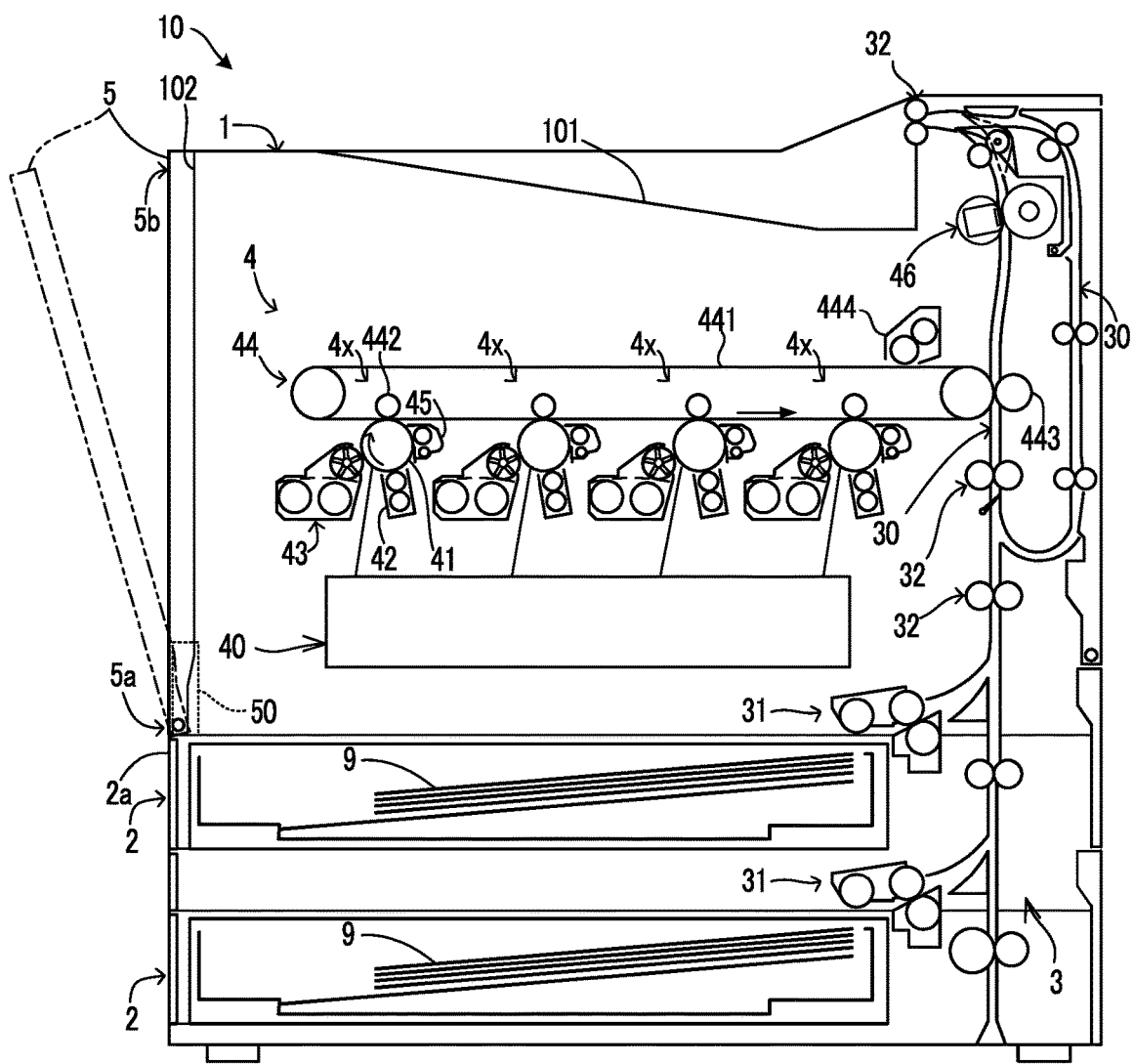
FIG. 1 is a configuration diagram of an image forming apparatus according to an embodiment.

As shown in FIG. 1, the image forming apparatus 10 includes a sheet conveying device 3 and the printing device 4, which are provided in a main body 1. The main body 1 is a housing that houses the sheet conveying device 3, the printing device 4, and the like.

Further, the image forming apparatus 10 includes one or more sheet cassettes 2 which are drawably installed in the main body 1. The sheet cassette 2 can house a plurality of sheets 9.

The printing device 4 includes one or more image forming portions 4x, a laser scanning unit 40, a transfer device 44, and a fixing device 46. The image forming portion 4x includes a drum-shaped photoconductor 41, a charging device 42, a developing device 43, a drum cleaning device 45, and the like.

The sheet conveying device 3 includes a sheet feed device 31, and a plurality of conveying roller pairs 32. The sheet feed device 31 feeds a sheet 9 housed in the sheet cassette 2 to the sheet conveying path 30 in the main body 1. The sheet conveying path 30 forms a passage through which the sheet 9 is conveyed.

The plurality of conveying roller pairs 32 are rotated by being driven by a drive device (not shown). The plurality of conveying roller pairs 32 convey the sheet 9 along the sheet conveying path 30. One of the plurality of conveying roller pairs 32 discharges the sheet 9 from the sheet conveying path 30 onto a discharge tray 101.

The printing device 4 forms an image on the sheet 9 conveyed along the sheet conveying path 30. In the present embodiment, the printing device 4 forms a toner image on the sheet 9. The toner is an example of a granular developer.

The image forming apparatus 10 shown in FIG. 1 is a tandem type color image forming apparatus. Therefore, the printing device 4 includes a plurality of image forming portions 4x corresponding to toners of a plurality of colors. In the present embodiment, the printing device 4 includes four image forming portions 4x corresponding to four colors of yellow, cyan, magenta, and black.

In each of the image forming portions 4x, the photoconductor 41 rotates, and the charging device 42 charges the surface of the photoconductor 41. Further, the laser scanning unit 40 writes an electrostatic latent image on the surface of the photoconductor 41 by scanning with a laser beam.

Furthermore, the developing device 43 develops the electrostatic latent image on the surface of the photoconductor 41 as the toner image. The photoconductor 41 is an example of an image carrier that rotates while carrying the toner image.

The transfer device 44 transfers the toner image from the surface of the photoconductor 41 to the sheet 9. The transfer device 44 includes an intermediate transfer belt 441, four primary transfer devices 442 corresponding to the four image forming portions 4x, a secondary transfer device 443, and a belt cleaning device 444.

In the transfer device 44, the primary transfer devices 442 transfer the toner image on the surface of the photoconductor 41 to the surface of the intermediate transfer belt 441. Thus, the toner image is formed in color on the surface of the intermediate transfer belt 441.

The secondary transfer device 443 transfers the toner image formed on the intermediate transfer belt 441 to the sheet 9 conveyed along the sheet conveying path 30.

It is noted that, when the image forming apparatus 10 is a monochrome image forming apparatus, the secondary transfer device 443 transfers the toner image on the photoconductor 41 to the sheet 9.

The drum cleaning device 45 removes waste toner remaining on the surface of the photoconductor 41. The belt cleaning device 444 removes waste toner remaining on the intermediate transfer belt 441.

The fixing device 46 heats and presses the toner image transferred to the sheet 9. Thus, the fixing device 46 fixes the toner image on the sheet 9.

The main body 1 has a side opening 102. The side opening 102 is an opening formed in a side surface of the main body 1.

The image forming apparatus 10 further includes a cover member 5 and a cover support mechanism 50. The cover member 5 closes the side opening 102 of the main body 1. The cover support mechanism 50 supports the cover member 5 openably and closably.

The side opening 102 is formed above the sheet cassette 2. When the cover member 5 closes the side opening 102, the cover member 5 is upwardly adjacent to a side wall portion 2a of the sheet cassette 2.

When the cover member 5 is open, one or more process units constituting the printing device 4 can be taken out from inside the main body 1 through the side opening 102. For example, the process units include a drum unit including the photoconductor 41, a developing unit including the developing device 43, and the like.

In the image forming apparatus 10, it is desired that the cover support mechanism 50 be realized by a simple configuration.

In the present embodiment, the cover support mechanism 50 is realized by a simple configuration. Hereinafter, the configuration of the cover support mechanism 50 will be described.

[Cover Support Mechanism 50]

Figure 2:
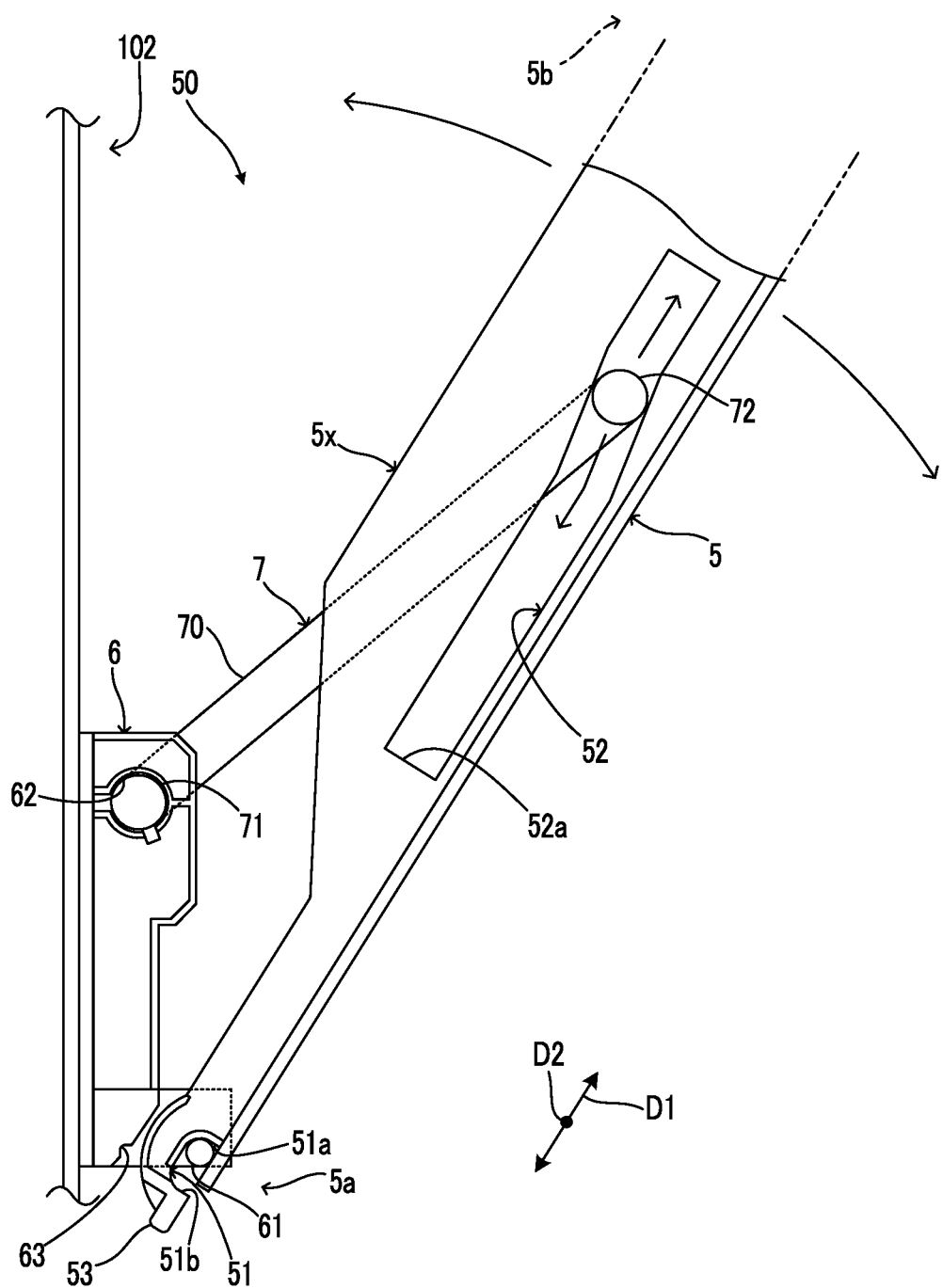
FIG. 2 is a configuration diagram of a cover support mechanism in the image forming apparatus according to the embodiment.
Figure 3:
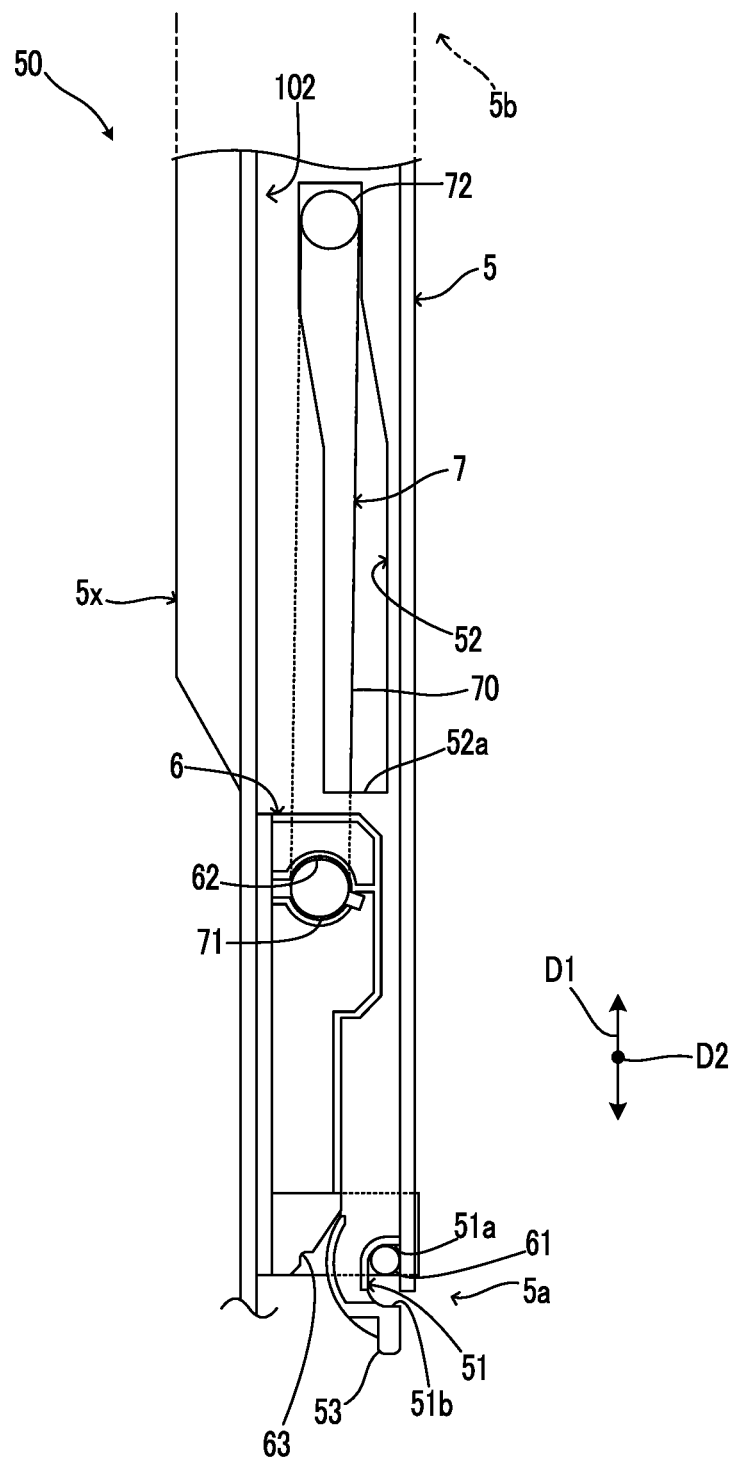
FIG. 3 is a side view of the cover support mechanism when a cover member is in a closed position in the image forming apparatus according to the embodiment.
Figure 4:
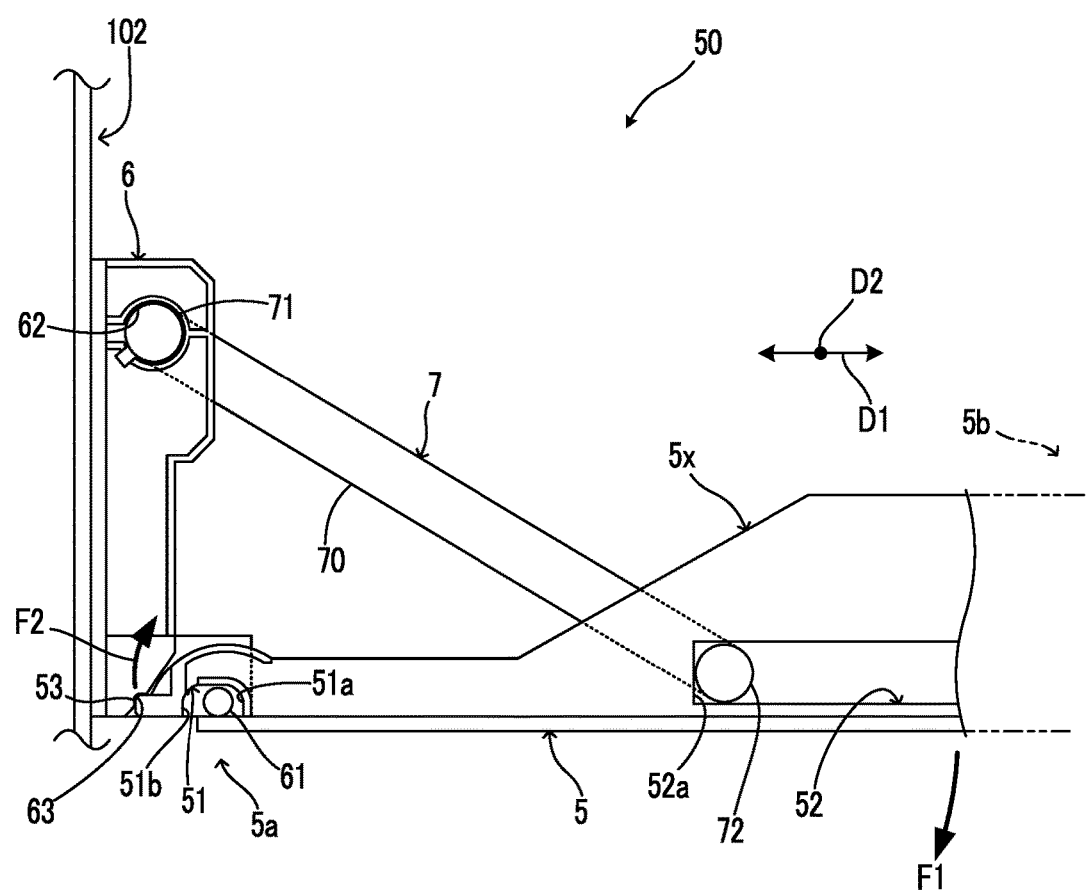
FIG. 4 is a side view of the cover support mechanism when the cover member is in an open position in the image forming apparatus according to the embodiment.

As shown in FIG. 2 to FIG. 4, the cover support mechanism 50 supports the cover member 5 rotatably between a closed position and an open position.

FIG. 3 shows a state where the cover member 5 is in the closed position. FIG. 4 shows a state where the cover member 5 is in the open position. FIG. 2 shows a state where the cover member 5 is in a position between the closed position and the open position.

The cover member 5 closes the side opening 102 in the closed position (see FIG. 3). In the open position, the cover member 5 projects from the lower edge of the side opening 102 of the main body 1 to the outside of the main body 1 (see FIG. 4).

In FIG. 1 to FIG. 4, a base end 5a of the cover member 5 is an end connected to the main body 1. A distal end 5b of the cover member 5 is an end opposite to the base end 5a.

In FIG. 2 to FIG. 4, an extending direction D1 is a direction along a line connecting the base end 5a and the distal end 5b of the cover member 5. In addition, a width direction D2 is a direction along which the lower edge and the upper edge of the side opening 102 extend. The width direction D2 is a direction that intersects the extending direction D1. In the present embodiment, the width direction D2 is a direction orthogonal to the extending direction D1.

The cover support mechanism 50 includes one or more cover-side members 5x, one or more main-body-side members 6, and one or more link members 7. For example, the cover support mechanism 50 includes two member sets each including a cover-side member 5x, a main-body-side member 6, and a link member 7. The two member sets are respectively arranged at both ends of the side opening 102 of the main body 1 in the width direction D2.

The cover-side member 5x is fixed to the cover member 5. The main-body-side member 6 is fixed to the main body 1. The link member 7 connects the cover-side member 5x and the main-body-side member 6.

The cover-side member 5x, the main-body-side member 6, and the link member 7 are molded members made of synthetic resin.

The main-body-side member 6 includes a main support portion 61, a joint support portion 62, and a main body engagement portion 63. The cover-side member 5x includes a supported portion 51, a joint guide portion 52, and a cover engagement portion 53. The link member 7 includes an arm portion 70, a first joint portion 71, and a second joint portion 72.

The main support portion 61 is provided at the lower edge of the side opening 102 of the main body 1. The joint support portion 62 is provided at a position higher than the main support portion 61 in the main body 1.

The supported portion 51 is provided at the base end 5a of the cover member The supported portion 51 is rotatably supported by the main support portion 61.

In the present embodiment, the supported portion 51 forms an elongated hole or a groove whose longitudinal direction is the extending direction D1. The main support portion 61 forms a shaft extending along the width direction D2. The main support portion 61 is inserted into the supported portion 51.

The supported portion 51 is slidable with respect to the main support portion 61 along the extending direction D1.

The joint guide portion 52 is formed along the extending direction D1 in the cover member 5. In the present embodiment, the joint guide portion 52 forms a groove or an elongated hole along the extending direction D1, which is opened in the width direction D2.

In the link member 7, the arm portion 70 is formed from the joint support portion 62 of the main body 1 to the joint guide portion 52 of the cover member 5. The first joint portion 71 is formed at a first end of the arm portion 70, and the second joint portion 72 is formed at a second end of the arm portion 70.

The first joint portion 71 is rotatably supported by the joint support portion 62. In the present embodiment, the joint support portion 62 forms a hole which is opened in the width direction D2.

The first joint portion 71 is a protrusion inserted into the joint support portion 62. The first joint portion 71 protrudes from the arm portion 70 in the width direction D2.

The second joint portion 72 is engaged with the joint guide portion 52 so as to be slidable along the extending direction D1. In the present embodiment, the joint guide portion 52 forms a groove or an elongated hole along the extending direction D1, which is opened in the width direction D2.

The second joint portion 72 is a protrusion inserted into the joint guide portion 52. The second joint portion 72 protrudes from the arm portion 70 in the width direction D2

The main body engagement portion 63 is provided at a deeper position from the side opening 102 than the main support portion 61 in the main body 1. The main body engagement portion 63 is provided at a position lower than the joint support portion 62 in the main body 1.

The cover engagement portion 53 is provided at the base end 5a of the cover member 5. The cover engagement portion 53 can engage with the main body engagement portion 63.

In the present embodiment, the cover engagement portion 53 is a convex portion formed at the edge of the base end 5a of the cover member 5. On the other hand, the main body engagement portion 63 is a concave portion into which the cover engagement portion 53 is fitted.

It is noted that the cover engagement portion 53 may be concave, and the main body engagement portion 63 may be convex.

When the cover member 5 is in the closed position, the main support portion 61 supports the supported portion 51 at one end of the sliding range along the extending direction D1 (see FIG. 3).

In the present embodiment, when the cover member 5 is in the closed position, the first end 51a of the supported portion 51 in the longitudinal direction is supported by the main support portion 61.

The first end 51a of the supported portion 51 is an end on the distal end 5b side of the cover member 5 in the extending direction D1. The second end 51b of the supported portion 51 is an end on the base end 5a side of the cover member 5 in the extending direction D1.

The cover member 5 is rotatable around the main support portion 61 between the closed position and the open position (see FIG. 2).

When the cover member 5 rotates, the link member 7 rotates around the first joint portion 71, and the joint guide portion 52 guides the second joint portion 72 along the extending direction D1 (see FIG. 2).

When the cover member 5 is in the open position, the cover engagement portion 53 is engaged with the main body engagement portion 63, and the second joint portion 72 is engaged with a guide base end 52a of the joint guide portion 52 (see FIG. 4). The guide base end 52a is one end of the joint guide portion 52 on the base end 5a side of the cover member 5.

When the cover member 5 is in the open position, a moment load F1 of the cover member 5 around the second joint portion 72 acts as a force F2 for holding the engagement between the cover engagement portion 53 and the main body engagement portion 63 (see FIG. 4).

Further, when the cover member 5 is in the open position, the link member 7 and the main body engagement portion 63 hold the cover member 5 in the open position. On the other hand, when the cover member 5 is in the open position, the support of the supported portion 51 by the main support portion 61 is released.

In the present embodiment, when the cover member 5 is in the open position, the main support portion 61 is at a position where the main support portion 61 is not in contact with either of both ends of the supported portion 51 in the longitudinal direction (see FIG. 4). Accordingly, the support of the supported portion 51 by the main support portion 61 is released.

When the cover member 5 is in the open position, the process unit may be mounted on a portion of the cover member 5 which is closer to the distal end 5b than the guide base end 52a. In this case, the load of the process unit acts as a force that increases the moment load F1 of the cover member 5. As a result, the force F2 for holding the engagement between the cover engagement portion 53 and the main body engagement portion 63 is further increased.

By employing the cover support mechanism 50, a mechanism for supporting the cover member 5 openably and closably can be realized with a simple configuration.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:
1. An image forming apparatus comprising:
a printing portion disposed in a main body and configured to form an image on a sheet;
a cover member configured to close a side opening formed in a side surface of the main body; and
a cover support mechanism configured to support the cover member rotatably between a closed position and an open position, wherein the cover member closes the side opening in the closed position, and projects from a lower edge of the side opening of the main body to outside of the main body in the open position, the cover support mechanism includes:

a main support portion provided at the lower edge of the side opening of the main body;

a supported portion provided at a base end of the cover member;

a joint support portion provided at a position higher than the main support portion in the main body;

a joint guide portion formed in the cover member along an extending direction;

a link member including a first joint portion and a second joint portion;

a main body engagement portion provided at a deeper position from the side opening than the main support portion in the main body; and a cover engagement portion provided at the base end of the cover member and engageable with the main body engagement portion, the extending direction is a direction along a line connecting the base end and a distal end of the cover member, the supported portion is rotatably supported by the main support portion and is slidable with respect to the main support portion along the extending direction, the first joint portion is rotatably supported by the joint support portion, the second joint portion is engaged with the joint guide portion so as to be slidable along the extending direction, when the cover member is in the closed position, the main support portion supports the supported portion at one end of a sliding range along the extending direction, the cover member is rotatable around the main support portion between the closed position and the open position, when the cover member rotates, the link member rotates around the first joint portion, and the joint guide portion guides the second joint portion along the extending direction, when the cover member is in the open position, the cover engagement portion engages with the main body engagement portion, and the second joint portion engages with a guide base end which is one end of the joint guide portion on a base end side of the cover member, when the cover member is in the open position, a moment load of the cover member around the second joint portion acts as a force for holding the engagement between the cover engagement portion and the main body engagement portion, and the link member and the main body engagement portion hold the cover member in the open position, and when the cover member is in the open position, the support of the supported portion by the main support portion is released.

2. The image forming apparatus according to claim 1, wherein the main support portion forms a shaft extending along a width direction of the side opening, the supported portion forms an elongated hole or a groove whose longitudinal direction is the extending direction, the main support portion is inserted into the supported portion, when the cover member is in the closed position, one end of the supported portion in the longitudinal direction is supported by the main support portion, and when the cover member is in the open position, the main support portion is at a position where the main support portion is not in contact with either of both ends of the supported portion in the longitudinal direction, whereby the support of the supported portion by the main support portion is released.

3. The image forming apparatus according to claim 1, wherein the joint support portion forms a hole that is opened in a width direction of the side opening, the joint guide portion forms a groove or an elongated hole along the extending direction that is opened in the width direction, the first joint portion is a protrusion that is inserted into the joint support portion, and the second joint portion is a protrusion that is inserted into the joint guide portion.

* * * * *